US005734809A

United States Patent [19]
Higuchi

[11] Patent Number: 5,734,809

[45] Date of Patent: Mar. 31, 1998

[54] CONTROLLER FOR A PHOTOCOPIER PROVIDING THE ABILITY TO TRANSFER DATA TO A REPLACEMENT CONTROLLER THROUGH COMMUNICATION CHANNELS USED TO CONTROL SECTIONS OF THE PHOTOCOPIER

[75] Inventor: Masami Higuchi, Yokohama, Japan

[73] Assignee: Ricoh Company, Ltd., Tokyo, Japan

[21] Appl. No.: 68,303

[22] Filed: May 28, 1993

Related U.S. Application Data

[63] Continuation of Ser. No. 927,718, Aug. 11, 1992, abandoned, which is a continuation of Ser. No. 483,643, Feb. 23, 1990, abandoned.

[30] Foreign Application Priority Data

Feb. 27, 1989 [JP] Japan .................................... 1-43179
Mar. 13, 1989 [JP] Japan .................................... 1-57939

[51] Int. Cl.$^6$ .................................... G06F 11/16

[52] U.S. Cl. .................................... 395/181

[58] Field of Search .................... 364/DIG. 1, DIG. 2; 371/78.1, 8.2, 9.1, 10.1, 16, 10.2, 10.3; 355/204, 205, 206, 207, 208; 395/200, 250, 275, 325, 375, 500, 575, 650, 725, 750, 800

[56] References Cited

U.S. PATENT DOCUMENTS

Re. 32,253 9/1986 Bartulis et al. .................... 355/209
4,247,193 1/1981 Kantko et al. .................... 355/206
4,338,023 7/1982 McGibbon .................... 355/206
4,475,806 10/1984 Dunghton et al. .................... 355/209
4,514,846 4/1985 Federico et al. .................... 371/16
4,597,662 7/1986 Thrata et al. .................... 355/209
4,609,919 9/1986 Miyazaki et al. .................... 340/792
4,624,137 11/1986 Johnson et al. .................... 73/204
4,654,624 3/1987 Hagen et al. .................... 338/34
4,705,389 11/1987 Naikawa et al. .................... 355/210
4,706,061 11/1987 Johnson .................... 338/34
4,714,944 12/1987 Yoshiura .................... 355/55
4,724,462 2/1988 Yamasaki et al. .................... 355/206
4,746,953 5/1988 Knodt .................... 355/311
4,845,528 7/1989 Aoki et al. .................... 355/210
4,870,458 9/1989 Shibuya et al. .................... 355/200
4,975,838 12/1990 Mizuno et al. .................... 371/9.1

FOREIGN PATENT DOCUMENTS 169519A 1/1986 European Pat. Off. .................... 357/25
61191955 8/1986 Japan .
01100445 4/1989 Japan .................... 357/25

*Primary Examiner*—Robert B. Harrell
*Attorney, Agent, or Firm*—Oblon, Spivak, McClelland, Maier & Neustadt P.C.

[57] ABSTRACT

A control apparatus for a copier capable of transferring data from a non-volatile memory thereof to a computer or similar external data processing equipment, allowing the data in the memory to be rewritten from the outside, and in the event of replacement of a control board loaded with the memory allowing the data to be transferred from the memory of the old control board to a non-volatile memory of a new control board with accuracy and reliability. Data are transferred from the old control board to a new control board via serial communication controllers which are provided on the individual control boards. A communication unit is also provided on the control board so that the content of the non-volatile memory may be transferred to the external data processing equipment or rewritten by the latter.

11 Claims, 4 Drawing Sheets

CONTROLLER FOR A PHOTOCOPIER PROVIDING THE ABILITY TO TRANSFER DATA TO A REPLACEMENT CONTROLLER THROUGH COMMUNICATION CHANNELS USED TO CONTROL SECTIONS OF THE PHOTOCOPIER

This application is a Continuation of application Ser. No. 07/927,718 filed on Aug. 11, 1992, now abandoned, which is a continuation of Ser. No. 07/483,643 filed on Feb. 23, 1990, also abandoned.

BACKGROUND OF THE INVENTION

The present invention relates to a control apparatus for a copier and, more particularly, to a copier control apparatus capable of transferring data from a non-volatile memory thereof to a computer or similar external data processing equipment, allowing the date in the memory to be rewritten from the outside, and in the event of replacement of a control board which is loaded with the memory allowing the data to be transferred from the memory of the control board to a non-volatile memory of a new control board with accuracy and reliability.

Generally, a copier hats a non-volatile memory for storing various kinds of data necessary for copying operations such as initial set values, data variable due to aging, and data including the number of paper sheets having been transported and the duration of a copying operation. It has been customary to provide such a non-volatile memory on an exclusive board. The exclusive board for the memory is in turn mounted on a control board, or the memory itself is directly mounted on the control board. In the case that the exclusive board with the memory is mounted on the control board, the control board is replaced by removing the control board, then removing the exclusive memory board from the control board, and then affixing the memory board to a new control board. This kind of replacement procedure lacks in reliability because it is likely that the data in the memory is inadvertently erased or changed. On the other hand, when the memory is directly mounted on the control board, data in the non-volatile memory of the old control board is transferred to a non-volatile memory of a new control board. Such transfer of data has heretofore been not practicable without an exclusive communication port, resulting in an increase in cost.

As stated above, with prior art implementations, it is not easy to replace a control board while surely saving data which exist in a non-volatile memory of the control board.

SUMMARY OF THE INVENTION

It is therefore an object of the present invention to provide a copier control apparatus which, in the event of replacement of a control board, allows data stored in a non-volatile memory of an old control board to be transferred to a non-volatile memory of a new control board with accuracy and thereby preserves the data.

It is another object of the present invention to provide a copier control apparatus which allows data to be transferred from an old control board to a new control board without resorting to an exclusive communication port.

It is another object of the present invention to provide a generally improved copier control apparatus.

A control apparatus for a copier of the present invention comprises a memory for storing various kinds of data necessary for operations of the copier, and a communication control unit for interchanging data with sections of the copier which are to be controlled by the control apparatus, and transferring the data stored in the memory.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
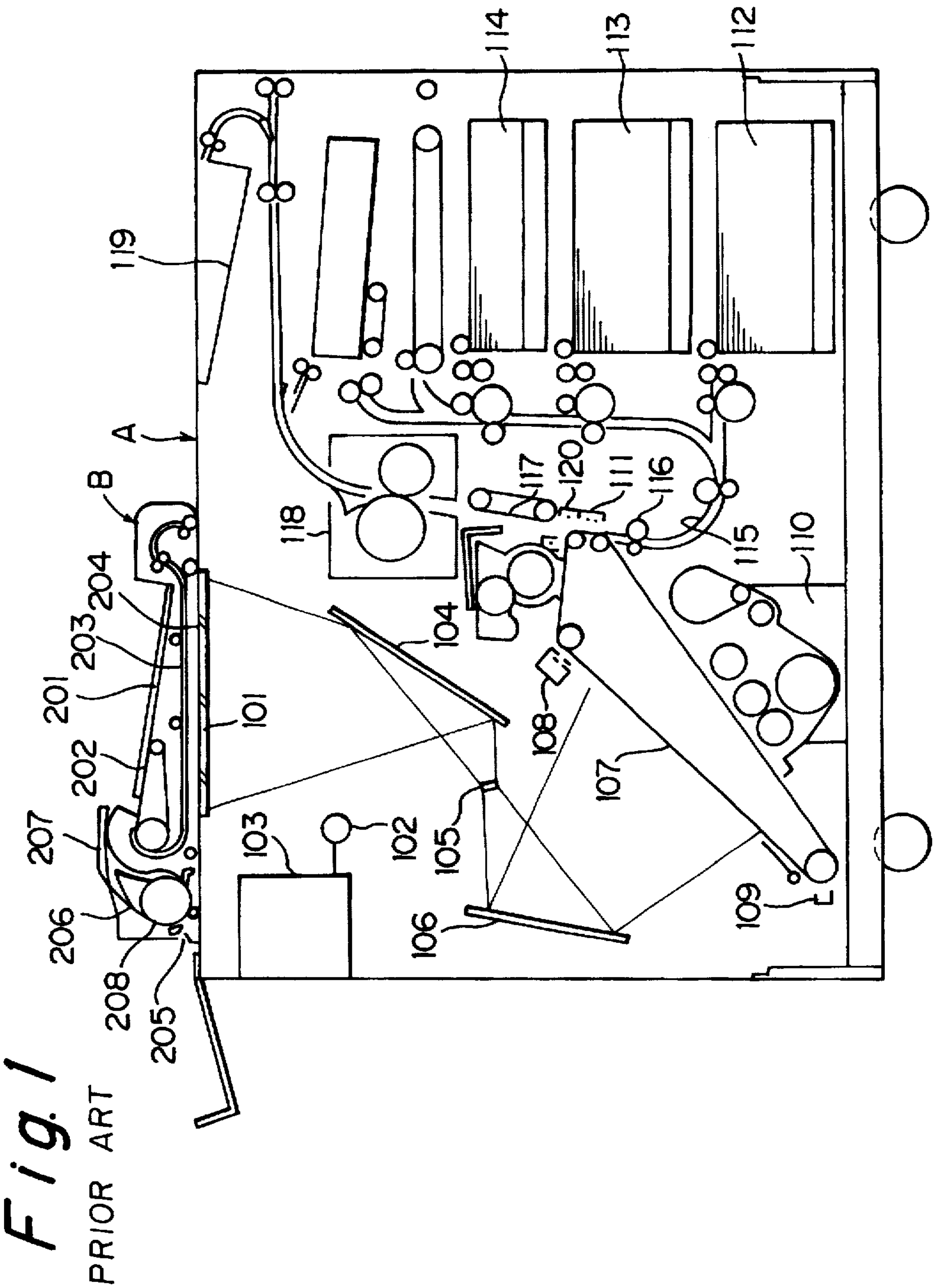
Fig. 1 PRIOR ART
FIG. 1 is a vertical section schematically showing the overall construction of a copier of the prior art to which the present invention is applicable.

Referring to FIG. 1 of the drawings, a copier to which the present invention is applicable is shown and generally made up of a copier body A and a recycling document feeder (RDF) B.

The copier body A is operated with the RDF B, as follows. After desired copying modes have been selected on an operation board which is mounted on the body A, a start button is pressed to cause the copier into a copying operation. The RDF B has a document tray 201 which is loaded with a stack of documents. The documents are fed from the document tray 201 one by one by a transport belt 202. The transport belt 202 drives the document to a glass platen 101 by way of a predetermined document transport path 203. On reaching the glass platen 101, the document is illuminated by a flash lamp 102 over its entire surface. A control apparatus embodying the present invention, which will be described, applies a charge beforehand to a power source 103 associated with the flash lamp 102, causing the lamp 102 to emit light at a predetermined timing. An imagewise reflection from the document reaches a photoconductive element in the form of a belt 107 by way of a first mirror 104, a through lens 105, and a second mirror 106. The belt 107 has been uniformly charged by a charger 108, so that the imagewise reflection forms an electrostatic latent image on the belt 107. An eraser 109 removes the charge from the belt 107 except for necessary areas of the latter. Then, a developing unit 110 develops the latent image on the belt 107. The developed image on the belt 107 is moved to an image transfer station so as to be transferred to a paper sheet by a transfer charger 111. After the transfer of the image to the paper sheet, the paper sheet is separated from the belt 107 by a separation charger 120. Specifically, the paper sheet is fed from any one of paper trays 112, 113 and 114 and, by being timed to the image on the belt 107, driven toward the image transfer station by a resister roller 116 along a transport path 115. The paper sheet carrying the developed image thereon is transported to a fixing unit 118 by a belt 117, whereby the image is fixed. The paper sheet coming out of the fixing unit 118 is driven out of the copier body A onto a tray 119. Meanwhile, the document positioned on the glass platen 101 and undergone the illumination is driven out by a document transport belt 204 and then returned to the document tray 201 by a reversible discharge roller 206. Specifically, when it is desired to discharge the document onto the tray 201 in the same position as the initial position, the roller 206 is reversed after the trailing edge of the document has moved away from a switching pawl 205. When it is desired to discharge the document upside down, the roller 206 is not reversed so as to drive it toward a reverse transport path 208.

Figure 2A:
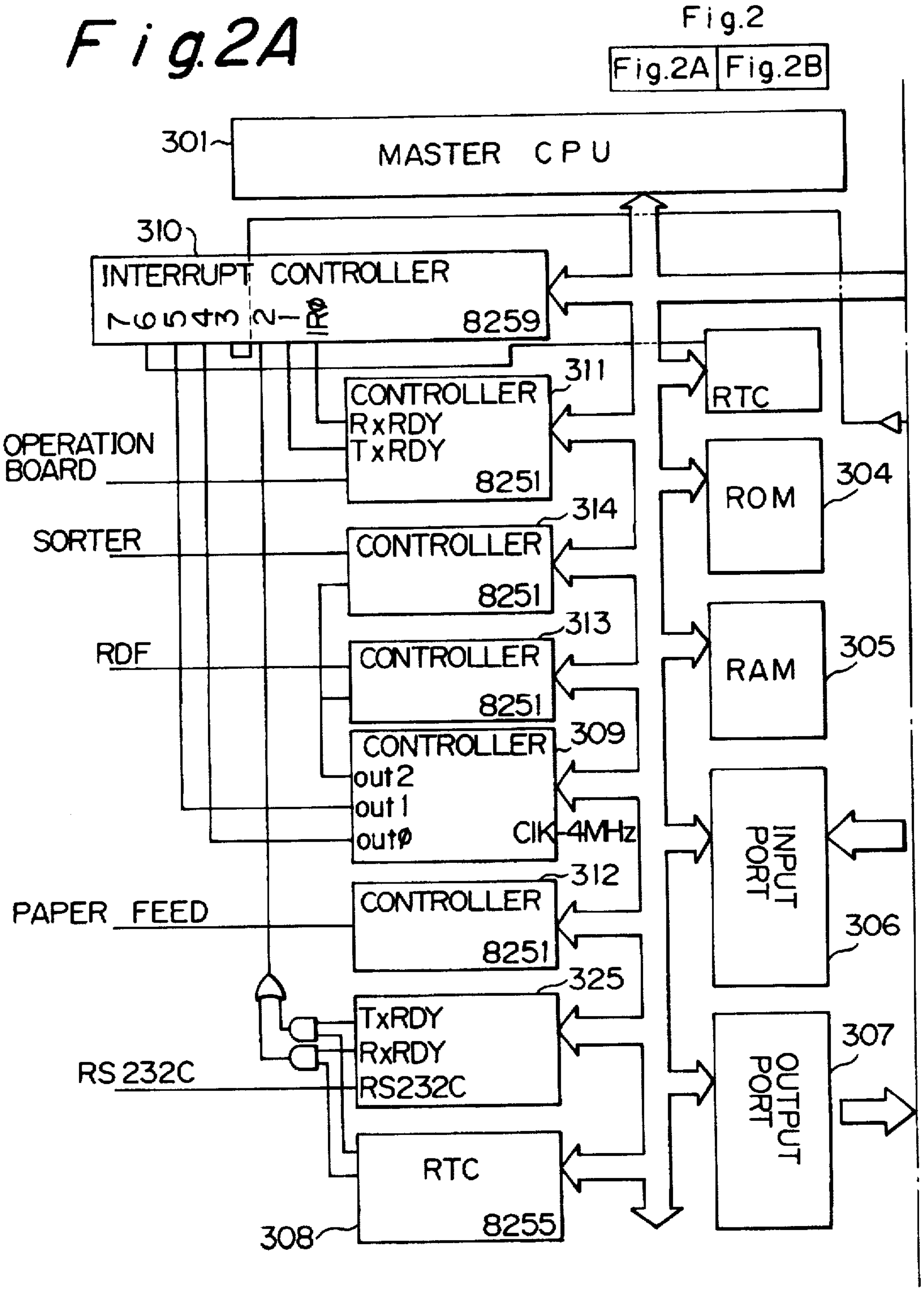
FIG. 2 is a schematic block diagram showing a copier control apparatus embodying the present invention.
Figure 2B:
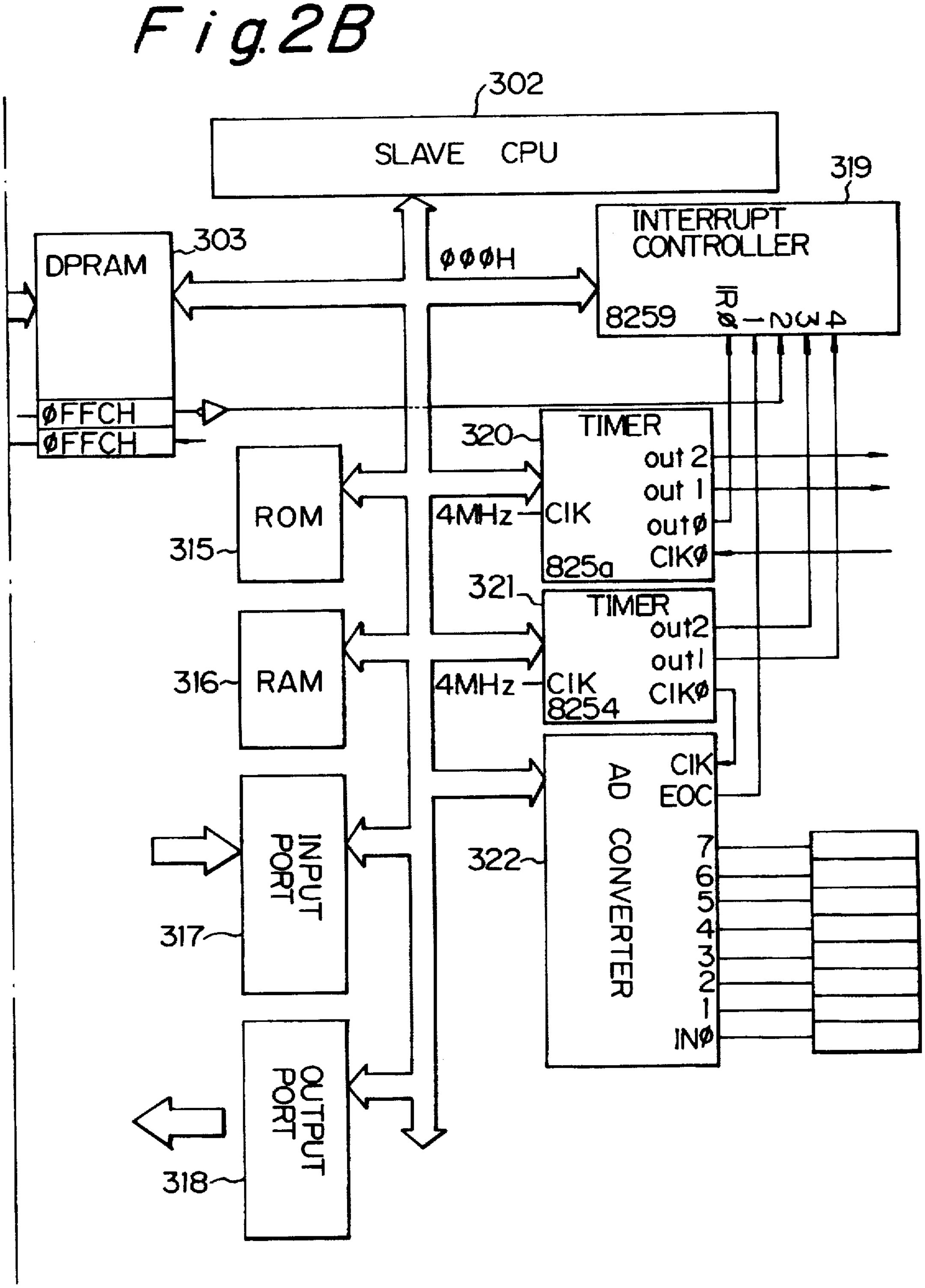
Figure 4:
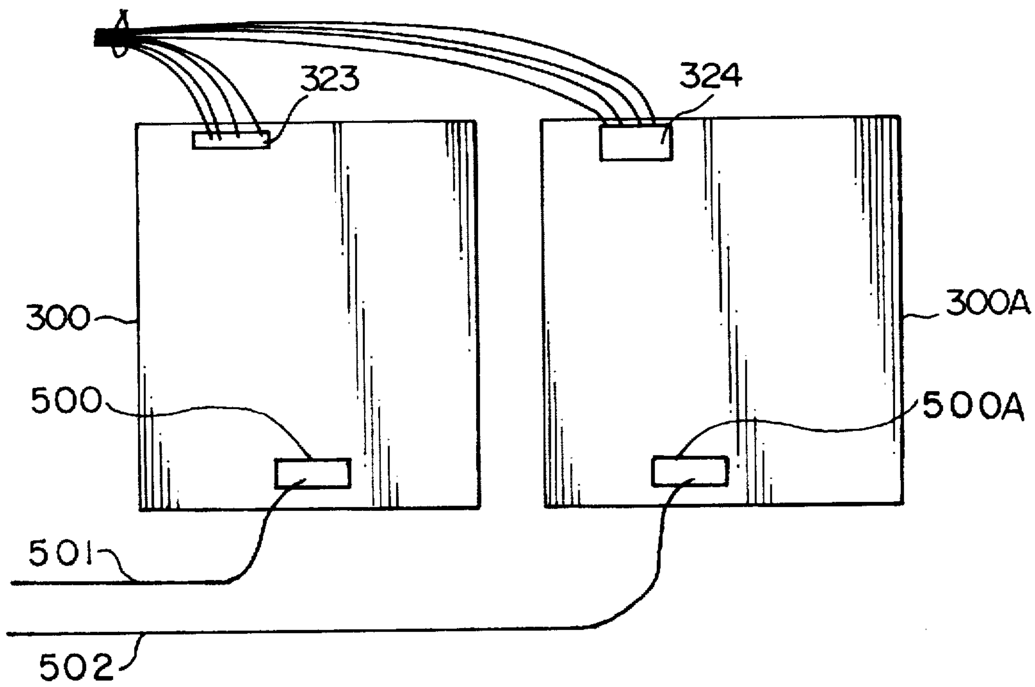
FIG. 4 demonstrates how an old and a new control board are electrically connected to each other for the transfer of data.

Referring to FIG. 2, a control apparatus embodying the present invention will be described. The control apparatus has a master CPU 301 and a slave CPU 302 which are mounted on a control board 300 (FIG. 4). The CPUs 301 and 302 are capable of communicating with each other via a dual port RAM (DPRAM) 303 in order to control the operations of the copier. A ROM 304, a non-volatile RAM 305, an input port 306, an output port 307, a RTC 308, a timer 309 and various kinds of serial communication controllers are interconnected to the master CPU 301. The serial communication controllers include an interrupt controller 310, an operation board controller 311, a paper feed controller 312, a RDF controller 313, and a sorter controller 314, and they are individually connected to their associated sections by optical fibers. A communication unit 325 is implemented by an RS232C port and allows the apparatus to transfer data to a computer or similar external data processing equipment. A back-up circuit is associated with the RAM 305 so as to store the data necessary for copying operations and the history of the machine, e.g. the number of paper sheets having been transported and the duration of a power-on state. The RAM 305 with such a back-up circuit, therefore, will not be cleared even when the main switch of the copier is turned off.

Figure 3:
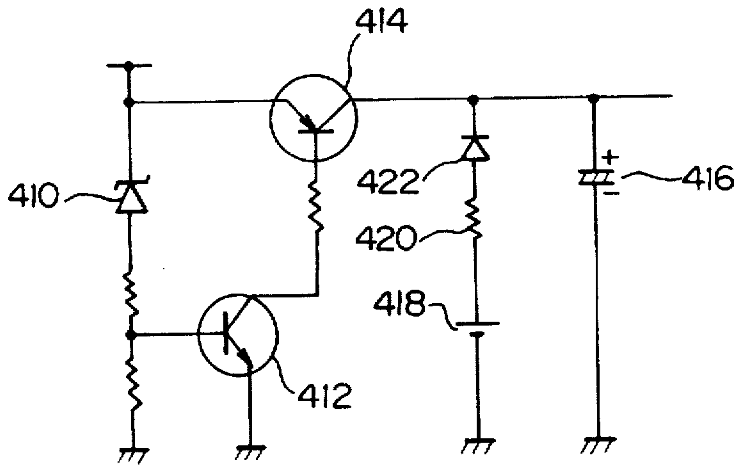
FIG. 3 is a circuit diagram showing a specific construction of a back-up circuit which is associated with a non-volatile memory shown in FIG. 2.

FIG. 3 depicts a specific construction of the back-up circuit which is associated with the RAM 305 as stated above. As shown, the back-up circuit has a Zener diode 410, transistors 412 and 414, a capacitor 416, and a battery 418. Usually, the capacitor 416 is charged by the Zener diode 410 and transistors 412 and 414. When the main switch is turned off, the battery 418 backs up the RAM 305. In the figure, the reference numerals 420 and 422 designate a resistor and a diode, respectively.

Referring again to FIG. 2, the slave CPU 302 is adapted for sequence control. Connected to the slave CPU 302 are a ROM 315, a non-volatile RAM 316, an input port 317, an output port 318, an interrupt controller 319, timers 320 and 321, and an analog-to-digital (AD) converter 322.

The non-volatile RAMs 305 and 316 are loaded with various data including initial set values such as an adjusted erasure value and adjusted register value and values which vary due to aging such as the adjusted light quantity and adjusted charge amount. The data further include logging data such as the number of paper sheets having been transported, the number of times that misfeed has occurred, the duration of a power-on state, and the duration of the energization of a motor. All such data are useful in grasping the current conditions of the copier rapidly and, therefore, in reducing the maintenance time. It is preferable, therefore, that when a control board is to be replaced due to a failure, the data stored in the memory of the control board be handed over to that of a new control board. The transfer of the data from the memory of the old control board to the memory of a new control board has heretofore been implemented by an exclusive communication port for data transfer. This is undesirable from the cost standpoint, as discussed earlier.

In the illustrative embodiment, the control board 300, FIG. 4, is loaded with the various serial communication controllers which are shown in FIG. 2 and adapted for copying operation control. Such serial communication controllers allow data to be transferred without resorting to an exclusive communication port. Further, if all the serial communication controllers provided on the control board 300 are available for the data transfer, it is possible to enhance the reliable transfer of data at the time of replacement of the control board. Specifically, as shown in FIG. 4, connectors 323 and 324 each being removably connectable to the sections of the copier to be controlled are affixed to the old or failed control board 300A and a new control board 300A, respectively. In the event of data transfer, the connectors 323 and 324 are electrically connected to each other to hand over the data via their serial communication controllers. More specifically, when a data transfer command is entered on a particular key of the copier, the old control board 300 transmits the data while the new control board 300A receives the incoming data. It is desirable that the data transfer command be prevented from being entered by user's ordinary manipulations, i.e., except under particular conditions such as the simultaneous depression of a plurality of keys. The transfer of data from the old control board 300 to the new control board 300A is executed by programs stored in the control boards. The conditional transmission and reception of data which rely on keys is well known in the art and, therefore, will be no described herein. It will be seen that the illustrative embodiment allows a control board to be replaced while preserving data having been stored in a non-volatile memory thereof, thereby eliminating the need for an exclusive communication port.

Further, in the illustrative embodiment, data stored in the non-volatile RAM 305 of the master CPU 301 can be fed out to the outside via the communication unit 325, while data from a computer or similar data processing equipment can be written in the non-volatile RAM 305 via the communication unit 325. An arrangement is made such that at the time of replacement the old and new control boards are operable at the same time with the copier being furnished with two power source connectors for ordinary operations. In this manner, the embodiment shown and described allows the apparatus to interchange data with external data processing equipment via the communication unit 325. Elements 500 and 500A indicate the power source connectors on the two boards, respectively, and elements 501 and 502 indicate the power lines supplying power to the two boards.

Various modifications will become possible for those skilled in the art after receiving the teachings of the present disclosure without departing from the scope thereof.

What is claimed is:

1. A control apparatus for a photocopier, comprising:

a first control board including first control board memory means for storing various kinds of data necessary for operations of the photocopier and including communication control means having a unique set of channels for interchanging control data with sections of the photocopier which are to be controlled by said first control board;

a second control board comprising second control board memory means;

power supply means for simultaneously supplying power to the first control board and to the second control board; and transfer means for transferring data stored in said first control board memory means from the first control board via at least one of the channels of the unique set of channels of the communication control means to the second control board memory means of the second control board, wherein normal copy operation cannot occur during transfer of data from the first control board to the second control board via the transfer means so that only one of the first control board and the second control board can control the copier at any time.

2. An apparatus as claimed in claim 1, wherein said first control board memory means comprises a non-volatile memory.

3. An apparatus as claimed in claim 2, wherein said communication control means comprises serial communication control means.

4. An apparatus as claimed in claim 1, wherein said data necessary for operations of the photocopier comprise initial set values, data variable due to aging, the number of paper sheets having been fed through the photocopier, and a duration of copying operation.

5. An apparatus according to claim 1, wherein:

the transfer means includes non-exclusive serial communication controllers on the first control board and the second control board.

6. An apparatus according to claim 1, wherein the second control board is a replacement board for the first control board.

7. An apparatus according to claim 1, further comprising:

control board replacement means for replacing said first control board by said second control board so that said second control board assumes control of said sections of the photocopier controlled by said first control board.

8. A photocopier according to claim 1, wherein at least some of said data necessary for operations of the photocopier corresponds to history of the copier.

9. A photocopier, comprising:

a control apparatus comprising a first memory means for storing operating history data corresponding to at least one of an operating history and to an operating status of said photocopier, a second memory means, communication controllers, and a communication port having at least a first unique communication channel for connecting said communication controllers to various parts of said photocopier and for controlling said various parts, and means for sending said operating history data stored in the first memory means to the second memory means, via said first unique communication channel; and wherein the communication port connects to a control board comprising only one of the first memory means and the second memory means.

10. A photocopier according to claim 9, wherein said means for sending is responsive to a data transfer command received by said photocopier.

11. A photocopier according to claim 9, wherein:

said communication controllers comprise a serial communication controller and said communication port comprises a serial communication port.

* * * * *